United States Patent
Jha et al.

(10) Patent No.: US 10,194,482 B2
(45) Date of Patent: *Jan. 29, 2019

(54) ENHANCED NODE B AND METHODS FOR PROVIDING SYSTEM INFORMATION UPDATES TO USER EQUIPMENT WITH EXTENDED PAGING CYCLES

(71) Applicant: Intel Corporation, Santa Clara, CA (US)

(72) Inventors: Satish Chandra Jha, Hillsboro, OR (US); Ali T. Koc, Portland, OR (US); Maruti Gupta, Portland, OR (US); Rath Vannithamby, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/838,990

(22) Filed: Dec. 12, 2017

(65) Prior Publication Data

US 2018/0167995 A1 Jun. 14, 2018

Related U.S. Application Data

(63) Continuation of application No. 15/096,435, filed on Apr. 12, 2016, now Pat. No. 9,854,623, which is a
(Continued)

(51) Int. Cl.
*H04W 76/28* (2018.01)
*H04W 36/22* (2009.01)
(Continued)

(52) U.S. Cl.
CPC ........... *H04W 76/28* (2018.02); *H04L 5/0032* (2013.01); *H04L 5/0035* (2013.01);
(Continued)

(58) Field of Classification Search
CPC ..... H04W 76/28; H04W 8/005; H04W 12/04; H04W 28/0289; H04W 28/085;
(Continued)

(56) References Cited

U.S. PATENT DOCUMENTS 9,215,637 B2   12/2015   Ramamurthi et al.
9,288,734 B2   3/2016    Jha et al.
(Continued)

FOREIGN PATENT DOCUMENTS

CN   101902800 A   12/2010
CN   105164949 A   12/2015
(Continued)

OTHER PUBLICATIONS

U.S. Appl. No. 14/140,827, U.S. Pat. No. 9,326,207, filed Dec. 26, 2013, Enhanced Node B and Methods for Providing System Information Updates to User Equipment With Extended Paging Cycles.
(Continued)

*Primary Examiner* — Maharishi V Khirodhar
(74) *Attorney, Agent, or Firm* — Schwegman Lundberg & Woessner, P.A.

(57) ABSTRACT

Embodiments of an enhanced Node B (eNB) and method to provide system information (SI) updates to user equipment (UE) in sleep or idle mode with an extending paging cycle are generally described herein. In some embodiments, a paging message configured to include an optional field to indicate whether there has been a system information (SI) update since a last paging occasion for a UE in sleep or idle mode with an extending paging cycle. System information updates are transmitted by the eNB during a system information modification period that is shorter than a period the extending paging cycle. The optional field may indicate whether or not the UE is to acquire the latest SI update during the current paging occasion.

23 Claims, 4 Drawing Sheets

Related U.S. Application Data continuation of application No. 14/140,827, filed on Dec. 26, 2013, now Pat. No. 9,326,207.

(60) Provisional application No. 61/832,644, filed on Jun. 7, 2013.

(51) Int. Cl.
| | |
|---|---|
| *H04W 28/02* | (2009.01) |
| *H04N 21/24* | (2011.01) |
| *H04W 28/08* | (2009.01) |
| *H04L 5/00* | (2006.01) |
| *H04L 5/14* | (2006.01) |
| *H04W 72/04* | (2009.01) |
| *H04W 52/02* | (2009.01) |
| *H04W 36/30* | (2009.01) |
| *H04N 21/262* | (2011.01) |
| *H04W 36/24* | (2009.01) |
| *H04L 29/06* | (2006.01) |
| *H04W 8/00* | (2009.01) |
| *H04W 12/04* | (2009.01) |
| *H04W 48/16* | (2009.01) |
| *H04W 68/00* | (2009.01) |
| *H04W 72/00* | (2009.01) |
| *H04W 68/02* | (2009.01) |
| *H04W 4/70* | (2018.01) |
| *H04W 4/90* | (2018.01) |
| *H04W 36/14* | (2009.01) |
| *H04W 36/36* | (2009.01) |
| *H04W 84/12* | (2009.01) |
| *H04W 92/18* | (2009.01) |

(52) U.S. Cl.
CPC .......... *H04L 5/0055* (2013.01); *H04L 5/14* (2013.01); *H04L 63/0442* (2013.01); *H04N 21/24* (2013.01); *H04N 21/2401* (2013.01); *H04N 21/26208* (2013.01); *H04W 8/005* (2013.01); *H04W 12/04* (2013.01); *H04W 28/0289* (2013.01); *H04W 28/085* (2013.01); *H04W 36/22* (2013.01); *H04W 36/24* (2013.01); *H04W 36/30* (2013.01); *H04W 48/16* (2013.01); *H04W 52/0212* (2013.01); *H04W 68/005* (2013.01); *H04W 68/02* (2013.01); *H04W 72/005* (2013.01); *H04W 72/0406* (2013.01); *H04W 4/70* (2018.02); *H04W 4/90* (2018.02); *H04W 28/08* (2013.01); *H04W 36/14* (2013.01); *H04W 36/36* (2013.01); *H04W 84/12* (2013.01); *H04W 92/18* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/24* (2018.01)

(58) Field of Classification Search
CPC ..... H04W 36/22; H04W 36/24; H04W 36/30; H04L 5/0035; H04L 5/0055; H04L 5/14
See application file for complete search history.

(56) References Cited

U.S. PATENT DOCUMENTS

| | | | |
|---|---|---|---|
| 9,326,207 B2* | 4/2016 | Jha | H04W 36/22 |
| 9,854,623 B2* | 12/2017 | Jha | H04W 76/048 |
| 2003/0007510 A1 | 1/2003 | Yeo et al. | |
| 2005/0185651 A1 | 8/2005 | Rinne | |
| 2005/0202823 A1 | 9/2005 | Shaheen et al. | |
| 2005/0262261 A1 | 11/2005 | Deshpande | |
| 2006/0019662 A1 | 1/2006 | Andrews et al. | |
| 2006/0245386 A1 | 11/2006 | Hu | |
| 2007/0025304 A1 | 2/2007 | Leelahakriengkrai et al. | |
| 2007/0076671 A1 | 4/2007 | Winget et al. | |
| 2008/0095119 A1 | 4/2008 | Bachmann et al. | |
| 2008/0220788 A1 | 9/2008 | Stanwood et al. | |
| 2009/0046656 A1 | 2/2009 | Kitazoe et al. | |
| 2009/0111468 A1 | 4/2009 | Burgess et al. | |
| 2009/0113086 A1 | 4/2009 | Wu et al. | |
| 2009/0124245 A1 | 5/2009 | Somasundaram et al. | |
| 2009/0285163 A1 | 11/2009 | Zhang et al. | |
| 2009/0310503 A1 | 12/2009 | Tenny et al. | |
| 2010/0023830 A1 | 1/2010 | Wengerter et al. | |
| 2010/0135166 A1 | 6/2010 | Ahluwalia | |
| 2010/0169732 A1 | 7/2010 | Wu | |
| 2010/0240385 A1 | 9/2010 | Löhr et al. | |
| 2010/0316096 A1 | 12/2010 | Adjakple et al. | |
| 2010/0329198 A1 | 12/2010 | Madan et al. | |
| 2011/0051654 A1 | 3/2011 | Blankenship et al. | |
| 2011/0053585 A1 | 3/2011 | Otonari | |
| 2011/0090802 A1 | 4/2011 | Kotrla et al. | |
| 2011/0113299 A1 | 5/2011 | Power et al. | |
| 2011/0136446 A1 | 6/2011 | Komninakis et al. | |
| 2011/0141952 A1 | 6/2011 | Wang et al. | |
| 2011/0249619 A1 | 10/2011 | Yu et al. | |
| 2011/0261750 A1 | 10/2011 | Fujito et al. | |
| 2011/0310816 A1 | 12/2011 | Kim et al. | |
| 2011/0317560 A1 | 12/2011 | Aramoto et al. | |
| 2012/0057478 A1 | 3/2012 | Brännström et al. | |
| 2012/0076040 A1 | 3/2012 | Hoshino et al. | |
| 2012/0087275 A1 | 4/2012 | Zhang et al. | |
| 2012/0120831 A1 | 5/2012 | Gonsa et al. | |
| 2012/0131204 A1 | 5/2012 | Song | |
| 2012/0178441 A1 | 7/2012 | Shaheen et al. | |
| 2012/0269140 A1 | 10/2012 | Nam et al. | |
| 2012/0315905 A1 | 12/2012 | Zhu et al. | |
| 2012/0329485 A1 | 12/2012 | Lee et al. | |
| 2013/0003629 A1 | 1/2013 | Jeong et al. | |
| 2013/0021991 A1 | 1/2013 | Ko et al. | |
| 2013/0028165 A1 | 1/2013 | Kim et al. | |
| 2013/0058308 A1 | 3/2013 | Jaiswal et al. | |
| 2013/0077543 A1 | 3/2013 | Kim et al. | |
| 2013/0083721 A1 | 4/2013 | Wu et al. | |
| 2013/0114575 A1 | 5/2013 | Fu et al. | |
| 2013/0142136 A1 | 6/2013 | Pi et al. | |
| 2013/0166644 A1 | 6/2013 | Sun et al. | |
| 2013/0176988 A1 | 7/2013 | Wang et al. | |
| 2013/0210467 A1 | 8/2013 | Kim et al. | |
| 2013/0308473 A1 | 11/2013 | Sun et al. | |
| 2013/0325684 A1 | 12/2013 | Vogler et al. | |
| 2013/0343252 A1 | 12/2013 | Chakraborty et al. | |
| 2013/0343293 A1 | 12/2013 | Jersenius et al. | |
| 2014/0029581 A1 | 1/2014 | Schatzmayr | |
| 2014/0036873 A1 | 2/2014 | Cheng et al. | |
| 2014/0064292 A1 | 3/2014 | Binetti et al. | |
| 2014/0122656 A1 | 5/2014 | Baldwin et al. | |
| 2014/0171069 A1 | 6/2014 | Pang et al. | |
| 2014/0204771 A1 | 7/2014 | Gao et al. | |
| 2014/0287717 A1 | 9/2014 | Golaup et al. | |
| 2014/0295840 A1 | 10/2014 | Keskitalo et al. | |
| 2014/0301241 A1 | 10/2014 | Kumar et al. | |
| 2014/0302853 A1 | 10/2014 | Militano et al. | |
| 2014/0328182 A1 | 11/2014 | Gao et al. | |
| 2014/0362689 A1 | 12/2014 | Koc et al. | |
| 2014/0362704 A1 | 12/2014 | Jha et al. | |
| 2014/0362745 A1 | 12/2014 | Davydov et al. | |
| 2014/0362752 A1 | 12/2014 | Jha et al. | |
| 2014/0362829 A1 | 12/2014 | Kazmi et al. | |
| 2014/0362832 A1 | 12/2014 | Rudolf et al. | |
| 2014/0366069 A1 | 12/2014 | Ramamurthi et al. | |
| 2014/0370906 A1 | 12/2014 | Lundborg et al. | |
| 2015/0020157 A1 | 1/2015 | Kim et al. | |
| 2015/0056992 A1 | 2/2015 | Morita | |
| 2015/0109993 A1 | 4/2015 | Kojima | |
| 2015/0133137 A1 | 5/2015 | Lee et al. | |

(56) References Cited

U.S. PATENT DOCUMENTS

| | | | |
|---|---|---|---|
| 2015/0156743 | A1 | 6/2015 | Lee et al. |
| 2015/0195716 | A1 | 7/2015 | Worrall et al. |
| 2015/0237644 | A1 | 8/2015 | Golitschek Edler Von Elbwart et al. |
| 2015/0270877 | A1 | 9/2015 | Hessler et al. |
| 2015/0358111 | A1 | 12/2015 | Marinier et al. |
| 2016/0021567 | A1 | 1/2016 | Agiwal et al. |
| 2016/0044734 | A1 | 2/2016 | Park et al. |
| 2017/0006659 | A1 | 1/2017 | Jha et al. |

FOREIGN PATENT DOCUMENTS

| | | |
|---|---|---|
| CN | 105165096 A | 12/2015 |
| CN | 105191418 A | 12/2015 |
| CN | 105230085 A | 1/2016 |
| CN | 105247919 A | 1/2016 |
| CN | 106851761 A | 6/2017 |
| KR | 1020110071406 A | 6/2011 |
| KR | 1020120041140 A | 4/2012 |
| TW | 201505461 A | 2/2015 |
| TW | 201517645 A | 5/2015 |
| WO | WO-2009148258 A2 | 12/2009 |
| WO | WO-2011100492 A1 | 8/2011 |
| WO | WO-2012053840 A2 | 4/2012 |
| WO | WO-2012153961 A2 | 11/2012 |
| WO | WO-2013051975 A1 | 4/2013 |
| WO | WO-2014049198 A1 | 4/2014 |
| WO | WO-2014197493 A1 | 12/2014 |
| WO | WO-2014197501 A1 | 12/2014 |
| WO | WO-2014197571 A1 | 12/2014 |
| WO | WO-2014197576 A1 | 12/2014 |
| WO | WO-2014197682 A1 | 12/2014 |
| WO | WO-2014197719 A1 | 12/2014 |

OTHER PUBLICATIONS

U.S. Appl. No. 15/096,435, U.S. Pat. No. 9,854,623, filed Apr. 12, 2016, Enhanced Node B and Methods for Providing System Information Updates to User Equipment With Extended Cycles.
"U.S. Appl. No. 14/104,725, Non Final Office Action dated Jan. 15, 2016", 12 pgs.
"U.S. Appl. No. 14/104,725, Response filed Oct. 5, 2015 to Restriction Requirement dated Aug. 4, 2015", 8 pgs.
"U.S. Appl. No. 14/104,725, Restriction Requirement dated Aug. 4, 2015", 9 pgs.
"U.S. Appl. No. 14/109,283, Advisory Action dated Mar. 11, 2016", 2 pgs.
"U.S. Appl. No. 14/109,283, Final Office Action dated Nov. 17, 2015", 16 pgs.
"U.S. Appl. No. 14/109,283, Non Final Office Action dated Jul. 8, 2015", 14 pgs.
"U.S. Appl. No. 14/109,283, Response filed Feb. 17, 2016 to Final Office Action dated Nov. 17, 2015", 13 pgs.
"U.S. Appl. No. 14/109,283, Response filed Oct. 8, 2015 to Non Final Office Action dated Jul. 8, 2015", 12 pgs.
"U.S. Appl. No. 14/134,985, Non Final Office Action dated Sep. 1, 2015", 30 pgs.
"U.S. Appl. No. 14/134,985, Response filed Dec. 22, 2015 to Non Final Office Action dated Sep. 1, 2015", 30 pgs.
"U.S. Appl. No. 14/137,243, Non Final Office Action dated Jul. 8, 2015", 11 pgs.
"U.S. Appl. No. 14/137,243, Notice of Allowance dated Nov. 4, 2015", 11 pgs.
"U.S. Appl. No. 14/137,243, Response filed Oct. 8, 2015 to Non Final Office Action dated Jul. 8, 2015", 9 pgs.
"U.S. Appl. No. 14/140,827, Non Final Office Action dated Aug. 13, 2015", 16 pgs.
"U.S. Appl. No. 14/140,827, Notice of Allowance dated Dec. 23, 2015", 9 pgs.
"U.S. Appl. No. 14/140,827, Response filed Jun. 19, 2015 to Restriction Requirement dated Apr. 20, 2015", 8 pgs.
"U.S. Appl. No. 14/140,827, Response filed Nov. 12, 2015 to Non Final Office Action dated Aug. 13, 2015", 17 pgs.
"U.S. Appl. No. 14/140,827, Restriction Requirement dated Apr. 20, 2015", 7 pgs.
"U.S. Appl. No. 14/141,940, Examiner Interview Summary dated Jul. 29, 2015", 3 pgs.
"U.S. Appl. No. 14/141,940, Non Final Office Action dated May 22, 2015", 23 pgs.
"U.S. Appl. No. 14/141,940, Notice of Allowability dated Sep. 8, 2015", 2 pgs.
"U.S. Appl. No. 14/141,940, Notice of Allowance dated Aug. 10, 2015", 9 pgs.
"U.S. Appl. No. 14/141,940, Response filed Jul. 7, 2015 to Non Final Office Action dated May 22, 2015", 23 pgs.
"U.S. Appl. No. 15/096,435, Corrected Notice of Allowability dated Nov. 9, 2017", 2 pgs.
"U.S. Appl. No. 15/096,435, Non Final Office Action dated May 9, 2017", 21 pgs.
"U.S. Appl. No. 15/096,435, Notice of Allowance dated Aug. 21, 2017", 8 pgs.
"U.S. Appl. No. 15/096,435, Response filed Aug. 2, 2017 to Non Final Office Action dated May 9, 2017", 14 pgs.
"Application Serial No. PCT/US2014/040882, International Preliminary Report on Patentability dated Dec. 17, 2015", 7 pgs.
"Architectures for dual connesctivty", 3GPP TSG RAN WG2 Meeting #81bis, R2-130989, (Apr. 2013), 6 pgs.
"Backhaul Considerations for User Plane Architectures for Dual Connectivity", Qualcomm Incorporated, R2-131158, 3GPP TSG-RAN2 #81 bis, Chicago, USA, [Online] retrieved from the internet: <http://www.3gpp.org/f tp/tsg_ran/wg2_r12/TSGR2_81bis/Docs/>, (Apr. 15-19, 2013), 1-3.
"Correction on implicit HARQ-ACK Resource Determination for PUCCH for Mat 1b with Channel Selection for TDD CA with Different UL-DL Configurations", CATT, R1-132691, 3GPP TSG-RAN WG1 Meeting #73, Fukuoka, Japan, (May 20, 2013), 2-4.
"Correction on UARQ-ACK Transmission for a UE con figured with PUCCH Format 3", Intel Corporation, R1-132684, 3GPP TSG-WG1 Meeting #73, Fukuoka, Japan, (May 20, 2013), 4-5.
"Discussion on S1 split for dual-connectivity", Interdigital Communications, R2-131326, 3GPP TSG-RAN WG2 #81bis, Chicago, USA, [Online] retrieved from the internet: <http://www.3gpp.org/ftp/tsg_ran/wg2_r12/TSGR2_81bis/Docs/>, (Apr. 15-19, 2013).
"Discussion on the open issue of the solution extended DRX in idle state", Fujitsu, Fukuoka, Japan, May 20-24, 2013, (2013), 5 pgs.
"European Application Serial No. 14807823.1, Extended European Search Report dated Apr. 10, 2017", 16 pgs.
"European Application Serial No. 14808258.9, Response filed Aug. 3, 2017 to Extended European Search Report dated Jan. 17, 2017", 13 pgs.
"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10., (Jul. 2012), 210 pgs.
"Evolved Universal Terrestrial Radio Access (E-UTRA); Radio Resource Control (RRC); Protocol specification", 3GPP TS 36.331 version 10.6.0 Release 10., (Jul. 2012), 306 pgs.
"Evolved Universal Terrestrial Radio Access Network (E-UTRAN): Architecture description", 3GPP TS 36.401 version 10.4.0 Release 10, (2012), 22 pgs.
"Impacts of Splitting a Single EPS Bearer Between Two (or more) eNBs", 3GPP TSG RAN WG2 Meeting #81bis, R2-131529, (Apr. 2013), 5 pgs.
"International Application Serial No. PCT/US2014/040734, International Preliminary Report on Patentability dated Dec. 17, 2015", 10 pgs.
"International Application Serial No. PCT/US2014/040734, International Search Report dated Sep. 12, 2014", 5 pgs.
"International Application Serial No. PCT/US2014/040734, Written Opinion dated Sep. 12, 2014", 8 pgs.

(56) References Cited

OTHER PUBLICATIONS

"International Application Serial No. PCT/US2014/040743, International Preliminary Report on Patentability dated Dec. 17, 2015", 7 pgs.

"International Application Serial No. PCT/US2014/040743, International Search Report dated Sep. 24, 2014", 3 pgs.

"International Application Serial No. PCT/US2014/040743, Written Opinion dated Sep. 24, 2014", 5 pgs.

"International Application Serial No. PCT/US2014/040877, International Preliminary Report on Patentability dated Dec. 17, 2015", 6 pgs.

"International Application Serial No. PCT/US2014/040877, International Search Report dated Sep. 25, 2014", 4 pgs.

"International Application Serial No. PCT/US2014/040877, Written Opinion dated Sep. 25, 2014", 4 pgs.

"International Application Serial No. PCT/US2014/040882, International Search Report dated Sep. 25, 2014", 3 pgs.

"International Application Serial No. PCT/US2014/040882, Written Opinion dated Sep. 25, 2014", 5 pgs.

"International Application Serial No. PCT/US2014/041068, International Preliminary Report on Patentability dated Dec. 17, 2015", 7 pgs.

"International Application Serial No. PCT/US2014/041068, International Search Report dated Sep. 26, 2014", 3 pgs.

"International Application Serial No. PCT/US2014/041068, Written Opinion dated Sep. 26, 2014", 5 pgs.

"International Application Serial No. PCT/US2014/041142, International Preliminary Report on Patentability dated Dec. 17, 2015", 8 pgs.

"International Application Serial No. PCT/US2014/041142, International Search Report dated Oct. 1, 2014", 3 pgs.

"International Application Serial No. PCT/US2014/041142, Written Opinion dated Oct. 1, 2014", 6 pgs.

"Issues on extended paging cycle in RRC_IDLE", LG Electronics Inc. 3GPP TSG-RAN WG2 #82 R2-131890, (May 20-24, 2013), 3 pgs.

"Mobility for dual connectivity", R2-130990, 3GPP TSG RAN WG2 Meeting #81 bis, (2013).

"Power Preference Indication and Qos Requirements", ZTE Corporation, R2-130131 In 3GPP TSG-RAN WG2 Meeting #81 St Julians. Malta, (Jan. 28-Feb. 1, 2013).

"Radio link failure handling for dual connectivity", R2-131990, 3GPP TSG RAN WG2 Meeting #82, (May 2013), 1-2.

"Resource Coordination for Small Cells with Non-Ideal Backhaul", Samsung, R1-131027, 3GPP TSG RAN WG1 #72bis, Chicago, USA, (Apr. 15, 2013), 1-2.

"Summary of email discussion [81bis#16][Joint/MTCe] Initial qualitative analysis of the proposed solutions for UEPCOP", Fukuoka, Japan, May 20-24, 2013, [Online]. Retrieved from the Internet: <http://www.3gpp.org/ftp/tsg_ran/WG2_RL2/TSGR2_82/Docs/>, (2013), 28 pgs.

"Taiwanese Application Serial No. 103119401, Office Action dated Aug. 20, 2015", W/ English Search Report, 7 pgs.

"Taiwanese Application Serial No. 103119401, Response filed Feb. 19, 2016 to Office Action dated Aug. 20, 2015", (English Translation of Claims), 82 pgs.

"Taiwanese Application Serial No. 103119568, Office Action dated Sep. 22, 2015", W/ English Translation, 13 pgs.

"Taiwanese Application Serial No. 103119568, Response filed Dec. 16, 2015 Office Action dated Sep. 22, 2015", W/ English Claims, 14 pgs.

"Transparent End-to-End Packet-Switched Streaming Service(PSS) :Progressive Download and Dynamic Adaptive Streaming over HTTP(3GP-DASH)", 3GPP TS 26.247 V 11.5.0 Release 11, (2013), 119 pgs.

"UE power consumption gain for the extended DRX", Samsung, Fukuoka, Japan- May 20-24, 2013, (2013), 6 pgs.

"UP Radio Procotol for Dual Connecivity", LG Electronics Inc., R2-131231, 3GPP TSG-RAN2 Meeting #81bis, (Apr. 2013), 1-7.

"User Plane Architecture for Dual-Connectivity", R2-131939, 3GPP TSG-RAN WG2 #82, (May 2013).

Andrews, M., et al., "Optimal utility based multi-user throughput allocation subject to throughput constraints", IEEE INFOCOM vol. 4, (2005), 2415-2424.

Jalali, A, et al., "Data throughput of CDMA-HDR a high efficiency-high data rate personal communication wireless system", IEEE 51st Vehicular Technology Conference vol. 3, (2000), 1854-1858.

Liu, X., et al., "A framework for opportunistic scheduling in wireless networks", Computer Networks vol. 41, (2003), 451-475.

Lui, X., et al., "Opportunistic transmission scheduling with resource-sharing constraints in wireless networks", IEEE Selected Areas in Communications vol. 19 (10), (2006), 2053-2064.

Singh, S., et al., "Video capacity and QoE enhancements over LTE", IEEE International Conference on Communications (ICC), (2012), 7071-7076.

Stolyar, A. L., "On the Asymptotic Optimalityof the Gradient Scheduling Algorithm for Multiuser Throughput Allocation", Operations Research vol. 53, (2005), 12-25.

"3rd Generation Partnership Project; Technical Specification Group Radio Access Network; Evolved Universal Terrestrial Radio Access (E-UTRA) and Evolved Packet Core (EPC); User Equipment (UE) conformance specification Part 3: Test Suites (Release 10)", 3GPP Standard; 3GPP TS 36.523-3, 3GPP, vol. RAN WG5, No. V10.3.0, (Mar. 5, 2013), 63-133.

"Chinese Application Serial No. 201480026074.0, Office Action dated Jan. 23, 2018", w/English Translation, 20 pgs.

"Chinese Application Serial No. 201480026074.0, Response filed May 24, 2018 to Office Action dated Jan. 23, 2018", w/ English Claims, 18 pgs.

"European Application Serial No. 18168991.0, Extended European Search Report dated Jun. 7, 2018", 17 pgs.

"Power Saving for MTC Devices", 3GPP Draft; R2-102124 MTC Device Power Saving_R2, 3GPP, vol. RAN WG2, No. Beijing, China; Apr. 12, 2010, (Apr. 5, 2010).

"Summary of email discussion [81 bis#16][Joint/MTCe] Initial qualitative analysis of the proposed solutions for UEPCOP", Intel Corporation R2-132041, 23 pgs.

* cited by examiner

—PRIOR ART—

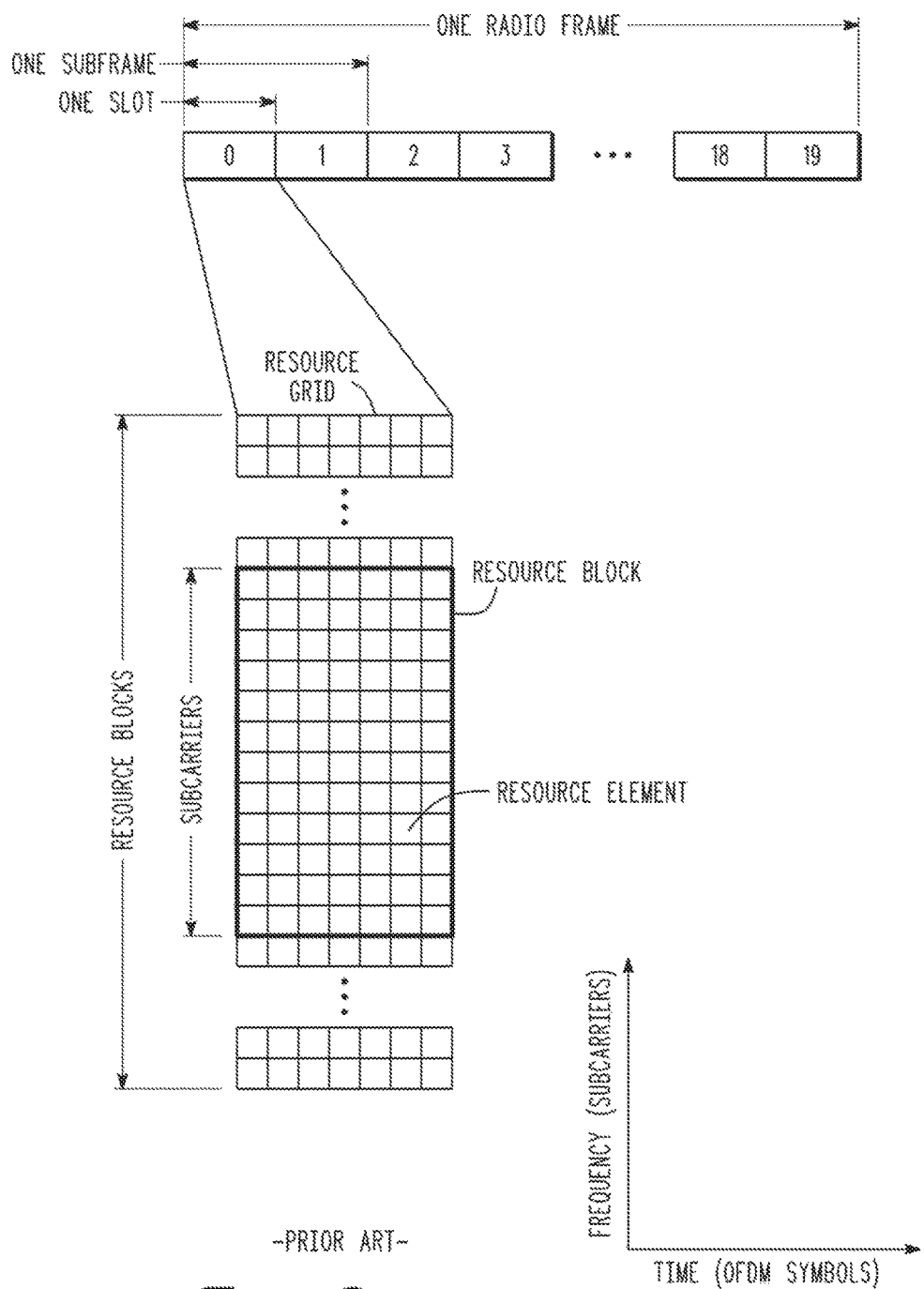
Fig. 6 —PRIOR ART—

ENHANCED NODE B AND METHODS FOR PROVIDING SYSTEM INFORMATION UPDATES TO USER EQUIPMENT WITH EXTENDED PAGING CYCLES

PRIORITY CLAIM

This application is a continuation of U.S. patent application Ser. No. 15/096,435, filed Apr. 12, 2016, now issued as U.S. Pat. No. 9,854,623, which is a. continuation of U.S. patent application Ser. No. 14/140,827, filed Dec. 26, 2013, now issued as U.S. Pat. No. 9,326,207, which claims priority under 35 U.S.C. 119(e) to U.S. Provisional Patent Application Ser. No. 61/832,644, filed Jun. 7, 2013, each of which is incorporated herein by reference in its entirety.

TECHNICAL FIELD

Embodiments pertain to wireless communications. Some embodiments relate to cellular networks, such as E-UTRAN networks operating in accordance with one of the 3GPP standards for the Long Term Evolution (LTE) (3GPP LTE). Some embodiments relate to system information (SI) updating user equipment (UE) in sleep or idle mode with an extending paging cycle. Some embodiments relate to machine-type communications (MTC).

BACKGROUND

One issue with user equipment, particularly user equipment that operate as MTC devices, is power consumption. One technique used to reduce power consumption is extending the device's paging cycle while the device is in idle mode or sleep mode. In this way, the device wakes up less frequently (e.g., to receive pages) and consumes less power. This may result in the possibility of missed pages that include system information updates making it difficult for the device reconnect with the network.

Thus there are general needs for systems and methods that provide system updates for user equipment (UE) in sleep or idle mode with an extending paging cycle.

BRIEF DESCRIPTION OF THE DRAWINGS

FIG. 6 shows a structure for the downlink resource grid for downlink transmissions from an enhanced node B (eNB) to a UE.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
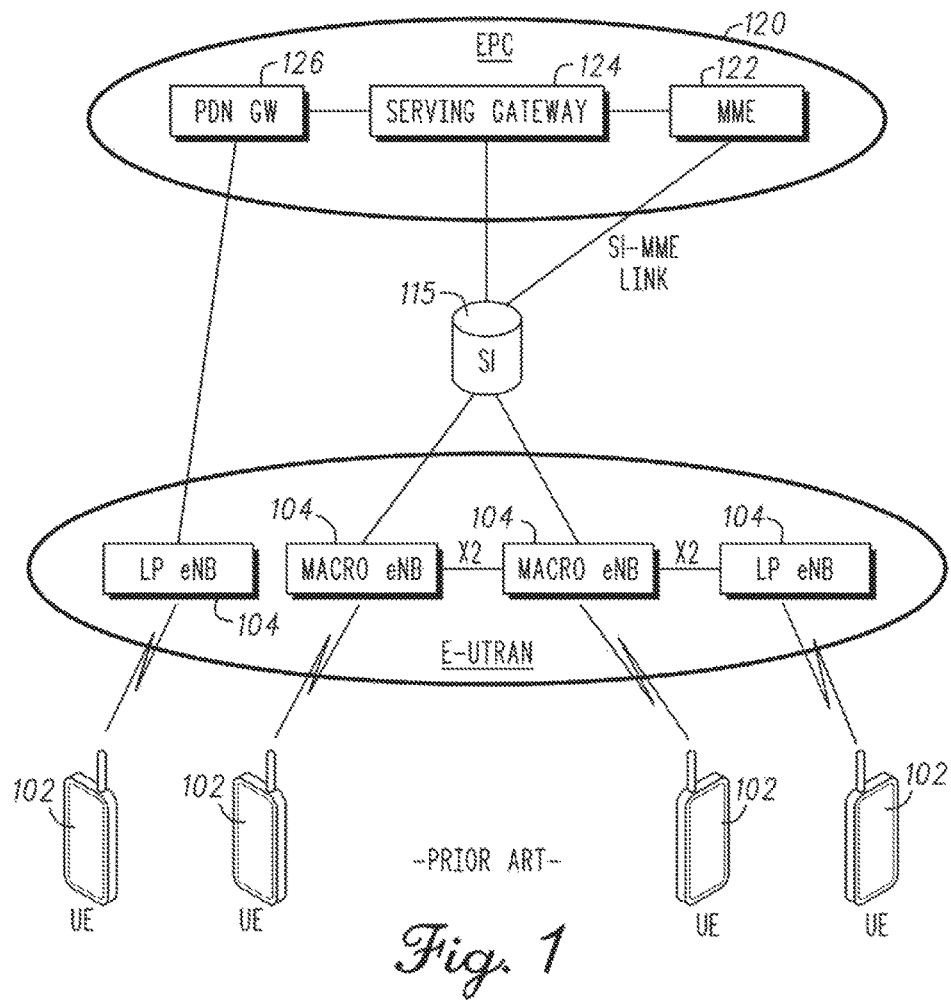
FIG. 1 shows a portion of an end-to-end network architecture of LTE (long term evolution) network with various components of the network in accordance with some embodiments.

FIG. 1 shows a portion of an end-to-end network architecture of LTE (long term evolution) network with various components of the network in accordance with some embodiments. The network comprises a radio access network (e.g., as depicted, the E-UTRAN or evolved universal terrestrial radio access network) and the core network (EPC) 120 coupled together through an S1 interface 115. (Note that for convenience and brevity sake, only a portion of the core network, as well as the RAN, is shown.

The core (EPC) 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). It manages mobility aspects in access such as gateway selection and tracking area list management. The serving GW 124 terminates the interface toward the RAN, and routes data packets between the RAN and core network. In addition, it may be a local mobility anchor point for inter-eNode-B handovers and also may provide an anchor for inter-3GPP mobility. Other responsibilities may include lawful intercept, charging, and some policy enforcement. The Serving GW and the MME may be implemented in one physical node or separate physical nodes. The PDN GW terminates a SGi interface toward the packet data network (PDN). It routes data packets between the EPC and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW and the Serving GW may be implemented in one physical node or separated physical nodes.

The eNode-B 104 (macro and micro) terminates the air interface protocol and is usually (if not always) the first point of contact for a UE 102. In some embodiments, an eNode-B 104 may fulfill various logical functions for the RAN including but not limited to RNC (radio network controller functions) such as radio bearer management, uplink and downlink dynamic radio resource management and data packet scheduling, and mobility management.

The S1 interface is the interface that separates the RAN and the EPC. It is split into two parts: the S1-U, which carries traffic data between the eNode-B and the Serving GW, and the S1-MME, which is a signaling interface between the eNode-B and the MME. The X2 interface is the interface between eNode-Bs (at least between most, as will be addressed below regarding micro eNBs). The X2 interface comprises two parts, the X2-C and X2-U. The X2-C is the control plane interface between eNode-Bs, while the X2-U is the user plane interface between eNode-Bs.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNode-B for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB 104 could be implemented with a picocell eNB since it is coupled to a macro eNB via an X2 interface. Picocell eNBs or other LP eNBs for that matter) may incorporate some or all functionality of a macro eNB. In some cases, this may be referred to as an access point base station or enterprise femtocell.

As discussed above, one issue with UEs, particularly UEs that operate as MTC devices, is power consumption. One technique used to reduce power consumption is extending the device's paging cycle while the device is in idle mode or sleep mode. In this way, the device wakes up less frequently (e.g., to receive pages) and consumes less power. This may result in the possibility of missed pages that include system information updates making it difficult for the device reconnect with the network.

In the current 3GPP spec, if a UE 102 is configured with an extended paging cycle (e.g., longer than SI change notification period), the UE 102 can miss the SI change notification. As a result, it may initiate a RRC connection establishment/reestablishment with invalid SI which is not allowed in the current 3GPP specification. Currently there is no mechanism which can assure that a UE can initiate RRC connection establishment/reestablishment with invalid SI in case of an extended paging cycle. Embodiments disclosed herein provide assurance that a UE 102 in sleep or idle mode with an extended paging cycle will initiate an RRC connection establishment/reestablishment with valid SI.

Currently, the maximum paging cycle is limited to 2.56 seconds, which is inadequate for reducing power consumption. Solutions allowing the extension of the paging cycle have been proposed for both MTC and non-MTC devices. The need for the extended paging cycle for MTC devices can be as long as in the range of hours. Paging is needed for a UE 102 (i.e., MTC or non-MTC device) in idle mode to receive various system information updates and indication of downlink traffic for the UE 102. Therefore, reliable reception of paging may be crucial in LTE network.

A UE 102 is not to initiate an RRC Connection establishment or an RRC Connection Reestablishment Request message until it has valid version of system informations (STs) such as a MIB, a SIB1, a. SIB2, etc. Whenever there is change in any SI, a UE 102 is notified through paging once or several times within a time period called modification period. Modification period is defined as modification Period Coeff {=n2, n4, n8, n16} times default Paging Cycle {=rf32, rf64, rf128, rf256}; which means modification period can vary from 640 ms to 40960 ms (40.96s) based on a current system configuration, for example. Since an extended paging cycle can be longer than 40.96s, for example, a UE may miss the SI change notification. This can result in having invalid SI at a UE 102 as the UE 102 may not be aware that SI has changed.

Figure 2:
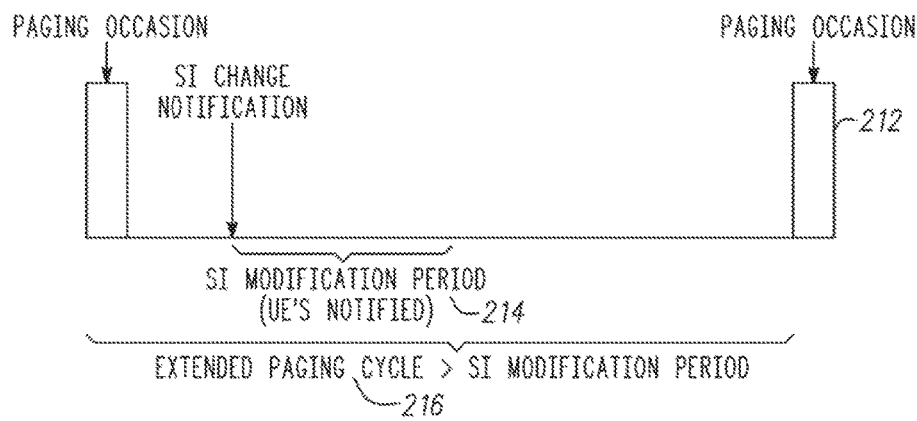
FIG. 2 illustrates how a UE in sleep or idle mode with an extending paging cycle can miss a system information change notification.

FIG. 2 illustrates how a UE in sleep or idle mode with an extending paging cycle can miss a system information change notification. Embodiments disclosed herein help address the problem of the UE 102 not being up-to-date with the latest SI update in cases where the UE 102 has been configured with an extended paging cycle having a period 216, having a paging occasion 212 longer than the SI change notification period 214 (also known as modification period) as can be seen from FIG. 2.

As mentioned above, there needs to be a mechanism to help guarantee that a UE 102 uses valid SI for several reasons. Some of them include being able to receive a paging message even after the paging frame calculation has changed due to change in SI after waking up from extended paging cycles.

Embodiments disclosed herein help assure that a UE 102 updates SI whenever SI is changed before initiating RRC connection establishment and/or reestablishment or to ensure timely receipt of downlink data, particularly when extended paging cycle is longer than the current modification period. Embodiments disclosed herein address different use cases of what happens if a UE 102 does not have the latest SI update.

Case 1: The UE 102 is able to receive the Paging Message even with change in System information. In these embodiments, if the extended paging cycle is longer than maximum modification period (e.g., 16×2.56=40.96 s) and there was a SI change notification event during the UE's last paging/Idle sleep, then the eNB 104 may be arranged to keep track of whether the upcoming Paging Occasion (PO) include UEs with an extended paging cycle.

If yes, then the eNB 104 may send out a paging message to let the UEs know that there was an SI update since their last PO. Since UEs in connected mode and other UEs with paging cycles up to 2.56 seconds will have already received this message earlier, embodiments disclosed herein help make sure that those UEs do not have to read all the SIBs to get the same update again. To ensure that this message is targeted only towards UEs with extended paging cycles rather than all UEs in connected mode, embodiments disclosed herein may modify the paging message by adding another field as described below.

Currently, fields in the paging message are optional and this new field may also be optional. This new field may be referred to as the "systemInfoModificationExtendedPagingCycle" or the "SIMExtPC" field. Thus, the eNB 104 may send a paging message with this field set to true, if there has been an update and set to false, if there has been no update since last PO. If set to true, then the UE 102 will acquire the latest SI update before going back to sleep. This paging message is sent even if there is no downlink data for any of the UEs in that particular PO or when there is no CMAS/ETWS/SI update information. This ensures that the UE always receives a page during its PO, if it is in extended paging cycle. CMAS may refer to Commercial Mobile Alerting System information and ETWS may refer to Earthquake and Tsunami Warning System information.

Figure 3:
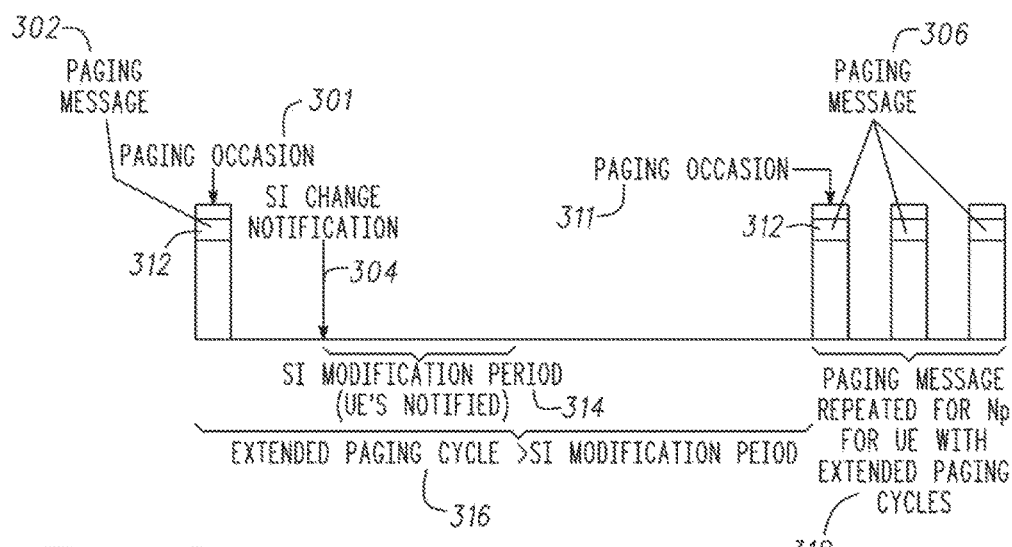
FIG. 3 illustrates the use of a paging message that includes an optional field to indicate whether there has been a system information update since a last paging occasion in accordance with some embodiments.

To help ensure receipt of this configured paging message, it may be repeated every radio frame starting from the Paging frame for Np frames to ensure robustness. Np may be broadcast as part of system information and may be stored by the UE beforehand. An example of this is illustrated in FIG. 3.

In accordance with some embodiments, Paging Message Paging field descriptions may include:
cmas-Indication; If present; indication of a CMAS notification.
cn-Domain; Indicates the origin of paging.
eab-ParamModification; If present; indication of a EAB parameters (SIB14) modification.
etws-Indication; If present; indication of an ETWS primary notification and/or ETWS secondary notification.
Imsi; The International Mobile Subscriber Identity, a globally unique permanent subscriber identity.
systemInfoModification; If present; indication of a BCCH modification other than SIB10, SIB11, SIB12 and SIB14.
ue-Identity; Provides the NAS identity of the UE that is being paged.
systemInfoModificationExtendedPagingCycle; If present; indication that there has been a modification in System Information and is directed specifically towards UEs that missed the systemInfoModification notification due to extended paging cycles greater than the system modification period.

Case 2: The UE is unable to receive Paging Message during PO. Sometimes, it is possible that a UE 102 may not be able to get the paging message itself due to the fact that the Paging Frame has shifted due to change in System Information (i.e., the parameter nB broadcast in SIB2 and the UE is unaware of this shift due to extended paging cycle). If this is the case, then the UE 102 will miss the PO itself.

In accordance with some embodiments, if a UE 102 is currently in an extended paging cycle, then before any PO, instead of waking up at the PO, the UE 102 may wake up several (e.g., at the most three) radio frames before the next actual PO to read the MIB, which is transmitted every radio frame at a fixed location. Once it reads the MIB, it can find the location of SIB1, which is transmitted every 20 ms and will be transmitted either in the next frame or the frame following it. The UE reads SIB1, which will allow it to find out if system information has been changed or not either in SIB1 or any other SIBs. The information whether SIB1 has been changed can be known by comparing the fields in the SIB1 with those already stored at the UE 102 and those of other SIBs can be known by comparing the value of the System-Information-Value-Tag which is updated whenever there is any change in the other SIBs. If the UE 102 finds out that the System-Information-Value-Tag has changed and also it is unable to read the paging message during PO, it is possible that it was unable to read it because of some change in the System-Information-Value-Tag that changed the location of paging frame. Thus, the UE 102 will assume that it may have potentially missed a Paging message.

In this case, even if the UE 102 has no data to send, it will perform RRC Connection procedure by first performing the RACH procedure and then sending a RRC Connection Request with a new cause, namely MissedPagingMessage in it. The eNB 104 receives the message and if there was no page directed towards the UE 102, the eNB 104 may send a message with an RRC Connection Setup Reject with a No Missed Paging Message indication. If there is a page waiting for the UE, the eNB 104 proceeds with the connection request as usual.

Figure 4:
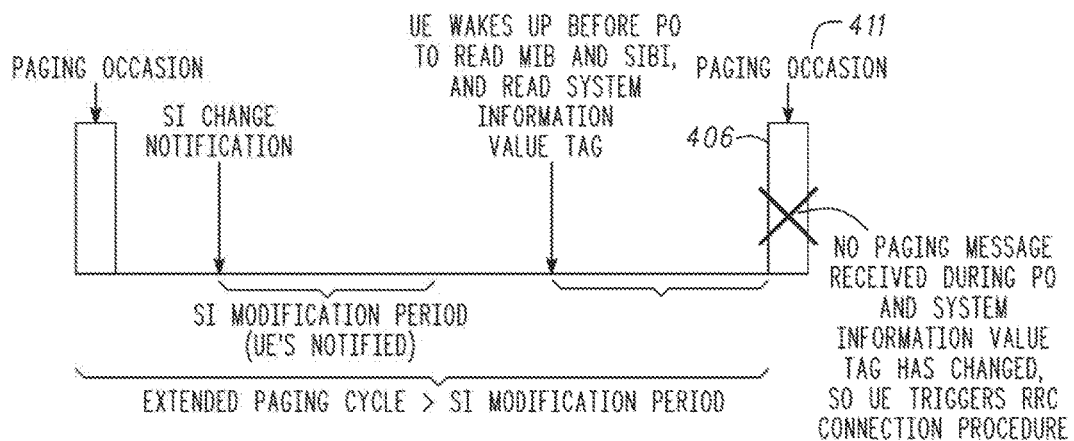
FIG. 4 illustrates how a UE in sleep or idle mode with an extending paging cycle can acquire a latest system information update when unable to receive a paging message during a paging occasion in accordance with some embodiments.

FIG. 4 illustrates how a UE in sleep or idle mode with an extending paging cycle can acquire a latest system information update when unable to receive a paging message during a paging occasion in accordance with some embodiments. FIG. 4 shows that a UE may wakeup before PO to read the MIB and SIB and to find the System-Information-Value-Tag field. These embodiments are discussed in more detail below.

Embodiments disclosed herein provide methods by which the UE may acquire valid System Information when it is in extended paging cycles lasting longer than the system modification period. In some embodiments, a new field called systemInfoModicationExtendedPagingCycle may be sent by the eNB for those UEs which sleep for long periods of time and may have missed SI updates. In some embodiments, a paging message is repeated to ensure robustness in case the UE misses the first PO after wakeup. This repetition parameter will be part of the Ms. Some embodiments address when the UE may not be able to receive the Paging message itself due to change in SI. In some embodiments, a UE with an extended paging cycle may wake up at most 3 radio frames earlier and obtain MIB and SIB1. In case of no changes, the UE checks the PO and responds as usual. In case it detects changes in SI update and if it also misses receiving a page, it triggers the RRC connection procedure in order to ensure that it has not in fact missed a page. In some embodiments, the UE will send a RRC connection request with a new message type to show that it is connecting because it missed a page. In some embodiments, the eNB 104 will respond with a RRC Connection Request Reject if there is no page for that UE 102. If there is a page for the UE 102, then the eNB 104 will respond with an RRC Connection Setup and go ahead with the connection establishment process.

In accordance with embodiments, an enhanced Node B (eNB) 104 may be configured to provide system information (SI) updates to user equipment (UE) in sleep or idle mode with an extending paging cycle. In these embodiments, the eNB 104 may transmit a paging message 302 or 306 (see FIG. 3) that includes an optional field 312 to indicate whether there has been a system information (SI) update since a last paging occasion (PO) 301 for user equipment (UE) 102 in sleep or idle mode with an extending paging cycle. In these embodiments, system information updates are transmitted by the eNB 104 during a system information modification period 314 that is shorter than the extending paging cycle period 316 causing the UE to possible miss the SI update change notification 304.

In some embodiments, the optional field 312 is a system information update modification for extended paging cycle (SIMExtPC) field (e.g., System Info Modification Extended Paging Cycle field).

In some embodiments, when a SI update change notification 304 has been issued during a sleep period of the UE 102, the eNB 104 may configure the SIMExtPC field 312 of the paging message 306 (e.g., SIMExtPC=true) to indicate to the UE 102 to acquire a latest SI update during a current paging occasion 311 (i.e., prior to going back to sleep).

In some embodiments, when a SI update change notification 304 has not been issued during the sleep period of the UE 102 in sleep or idle mode with an extending paging cycle, the eNB 104 may configure the SIMExtPC field 312 of the paging message 306 (e.g., SIMExtPC=false) to indicate to the UE 102 that a latest SI update does not need to be acquired.

In some embodiments, the eNB 104 may determine when an upcoming paging occasion 311 includes a UE 102 in sleep or idle with an extending paging cycle, and when the upcoming paging occasion 311 does include a UE 102 in sleep or idle mode with an extending paging cycle, the eNB 104 may be arranged to determine if a SI update change notification 304 has been issued during the sleep period of the UE 102, and configure the SIMExtPC field 312 of the paging message 306 for transmission in the upcoming paging occasion 311 to indicate whether or not the UE 102 is to acquire the latest SI update.

In some embodiments, the paging message 302 or 306 with the SIMExtPC field 312 may be transmitted to a UE 102 in sleep or idle mode with an extending paging cycle whether or not there is downlink data available for the UE 102.

In some embodiments, the eNB 104 may repeat transmission 318 of the paging message 306 after the paging occasion 311 for a predetermined number of frames (Np) (e.g., for robustness) when the SIMExtPC field 312 of the paging message 306 (e.g., SIMExtPC=true) is configured to indicate to the UE 102 to acquire the latest SI update. In these embodiments, UEs that are in sleep or idle mode with an extending paging cycle are arranged to receive repeated transmissions 318 of configured paging messages to help assure that a latest SI update is acquired.

UEs that are in an active or connected mode and UEs that are sleep or idle mode with a standard paging cycle may be configured to refrain from responding to paging messages that have the SIMExtPC field 312 (i.e., whether or not the SIMExtPC field 312 is configured to indicate to acquire a latest SI update). These UEs would have already received a SI update message earlier (e.g., during the SI modification period 314) and do not need to read or respond to these configured paging messages.

Figure 5:
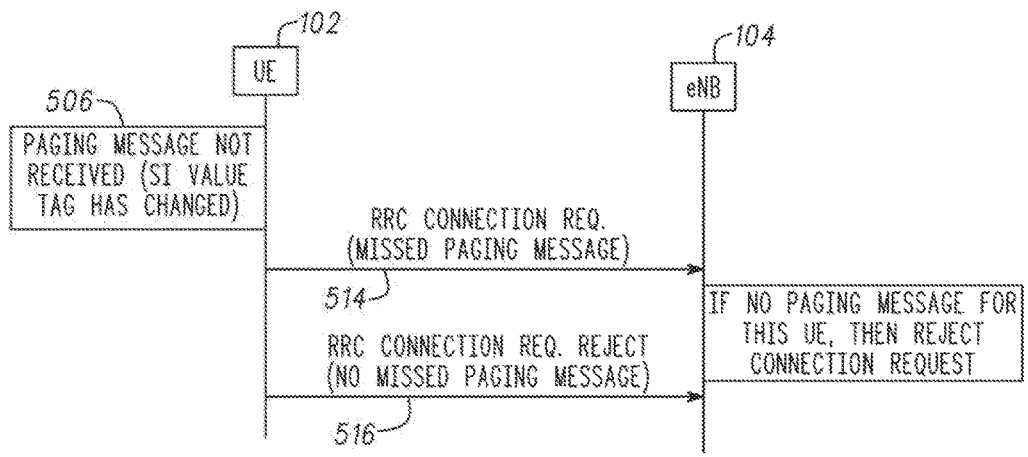
FIG. 5 illustrates a radio-resource control (RRC) connection request procedure in accordance with some embodiments.

In some embodiments, when the UE 102 (i.e., in sleep or idle mode with an extending paging cycle) is unable to receive the paging message 406 during a paging occasion 411 (see FIG. 4), the UE 102 may be arranged to waking-up a predetermined number of frames (e.g., three frames) before the paging occasion 411 to a receive a master information block (MIB) (i.e., which is transmitted every frame). In these embodiments, the UE 102 may be arranged to determine a location of a system information block (SIB) (e.g., an SIB type 1 (SIB1)) from the MIB, and receive the SIB1 (within a system information message) to determine if the system information has been updated. When the system information has been updated, the UE 102 may trigger a radio-resource control (RRC) connection procedure with an enhanced node B (eNB) 104 by sending an RRC connection request message 514 (see FIG. 5) that includes a missing paging message notification. When the system information has not been updated, receiving a paging message during a next-scheduled paging occasion 412 (as usual).

In some embodiments, the UE 102 may be arranged to receive an RRC connection setup reject message 516 (FIG. 5) from the eNB 104 when a paging message was not missed and receive an RRC connection response from the eNB 104 to set up a connection with the eNB 104 when a paging message 506 was missed. In some embodiments, the RRC procedure is performed regardless of whether the UE 102 has uplink data to send. In some embodiments, to determine if the system information has been updated, the UE 102 may compare a value of a system information value tag stored in the UE.

FIG. 6 shows a structure for the downlink resource grid for downlink transmissions from an eNB to a UE. The depicted grid illustrates a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements. In the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level L=1, 2, 4, or 8).

Figure 7:
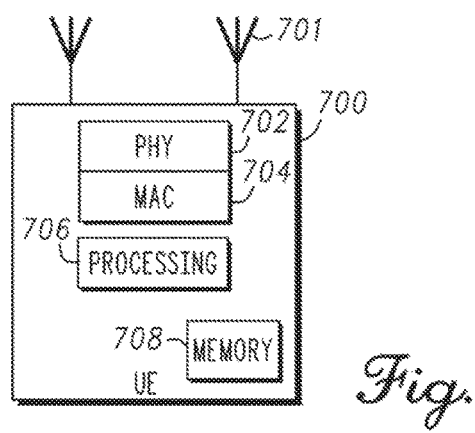
FIG. 7 illustrates a UE in accordance with some embodiments.

FIG. 7 illustrates a functional block diagram of a UE in accordance with some embodiments. UE 700 may be suitable for use as UE 102 (FIG. 1). The UE 700 may include physical layer circuitry 702 for transmitting and receiving signals to and from eNBs 104 (FIG. 1) using one or more antennas 701. UE 700 may also include medium access control layer (MAC) circuitry 704 for controlling access to the wireless medium. UE 700 may also include processing circuitry 706 and memory 708 arranged to perform the operations described herein.

In some embodiments, the UE 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 700 may include one or more of a keyboard, a display, a non-volatile memory port, multiple antennas, a graphics processor, an application processor, speakers, and other mobile device elements. The display may be an LCD screen including a touch screen.

The one or more antennas 701 utilized by the UE 700 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 700 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 700 and the eNBs may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain x 0.5 ms in the time domain. The PRBs may be allocated in pairs (in the time domain). In these embodiments, the PRB may comprise a plurality of resource elements (REs). A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 700 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 700 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 700. The CQI allows the UE 700 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE), the apparatus comprising:
   a memory configured to store information as stored system information; and
   processing circuitry in communication with the memory and arranged to:
      decode system information that comprises parameters for an extended discontinuous reception (eDRX) cycle and parameters for deriving Paging Occasions (POs);
   monitor one of the POs for a paging message;
      when a paging message for the UE received during the one of the POs comprises a systemInfoModification-eDRX parameter and the eDRX cycle is longer than a modification period during which notification of a system information change is provided, acquire new system information that comprises a master information block (MIB) and a plurality of system information blocks (SIBs) at a next opportunity;
      replace the stored system information with the new system information; and
      delay initiation of a radio resource control (RRC) connection procedure until after the MIB and the plurality of SIBs are acquired,
      wherein the modification period in radio frames is proportional to a default paging cycle that indicates a number of radio frames over which a paging cycle comprising the POs occurs.

2. The apparatus of claim 1, wherein:
   the default paging cycle is $2^{n+4}$ radio frames, where n is selected from among at least 1, 2, 3 and 4.

3. The apparatus of claim 1, wherein:
   a constant of proportionality between the modification period and the default paging cycle is $2^n$, where n is selected from among at least 1, 2, 3 and 4.

4. The apparatus of claim 1, wherein the processing circuitry is further arranged to:
   compare a systemInfoValueTag parameter of the stored system information with a systemInfoValueTag parameter of the new system information; and
   replace the stored system information with the new system information in response to a determination that the systemInfoValueTag parameter of the stored system information is different from the systemInfoValueTag parameter of the new system information.

5. The apparatus of claim 1, wherein the processing circuitry is further arranged to:
   delay initiation of the RRC connection procedure or initiation of transmission of a RRCConnectionReestablishmentRequest message until a valid version of at least the MIB and SIB 1 is obtained.

6. The apparatus of claim 1, wherein the processing circuitry is further arranged to:

decode the paging message independent of whether downlink data is present for the UE in the one of the POs.

7. The apparatus of claim 1, wherein:
   the presence of the systemInfoModification-eDRX parameter in the paging message indicates a Broadcast Control Channel (BCCH) modification other than SIB 10, SIB 11, SIB 12 and SIB 14.

8. The apparatus of claim 1, wherein the processing circuitry is further arranged to:
   perform the RRC connection procedure in response to the paging message, independent of whether uplink data is to be transmitted, the RRC connection procedure comprising performance of a Random Access Channel (RACH) procedure and generation of a RRC Connection Request with a Missed Paging Message, and
   decode message with an RRC Connection Setup Reject with a No Missed Paging Message indication in response to the paging message being free from being directed to the UE and an RRC Connection Response in response to the paging message being directed to the UE.

9. The apparatus of claim 1, wherein the processing circuitry is further arranged to:
   wake up from the idle mode a predetermined number of frames before the one of the POs.

10. The apparatus of claim 1, wherein:
    the UE is a machine type communication device.

11. An apparatus of an evolved NodeB (eNB), the apparatus comprising:
    processing circuitry arranged to:
       generate a notification of a change in system information for transmission in a first modification period and updated system information in a second modification period following the first modification period;
       determine whether at least one user equipment (UE) in idle or sleep mode has an extended discontinuous reception cycle (eDRX) that is longer than the first modification period;
       in response to a determination that the at least one UE has an eDRX that is longer than the first modification period, generate a paging message for the at least one UE in a paging occasion of the at least one UE, the paging message comprising a systemInfoModification-eDRX parameter that indicates that a system information update has occurred during the eDRX;
       generate updated system information for broadcast after transmission of the paging message, the updated system information comprising a master information block (MIB) and a plurality of system information blocks (SIBs); and
       engage in a radio resource control (RRC) connection procedure with the at least one UE after the MIB and the plurality of SIBs are transmitted,
       wherein the modification period in radio frames is proportional to a default paging cycle that indicates a number of radio frames over which a paging cycle comprising the POs occurs; and
    a memory configured to store the determination that the at least one UE has an eDRX that is longer than the first modification period.

12. The apparatus of claim 11, wherein:
    the updated system information has a systemInfoValueTag parameter that is different from a systemInfoValueTag parameter in system information broadcast prior to the updated system information.

13. The apparatus of claim 11, wherein the processing circuitry is further arranged to:
decode a RRC Connection Reestablishment Request message from the at least one UE after transmission of updated system information.

14. The apparatus of claim 11, wherein the processing circuitry is further arranged to:
repeat the paging message for a predetermined number of frames after the paging occasion.

15. The apparatus of claim 11, wherein the processing circuitry is further arranged to:
transmit the paging message independent of whether there is Commercial Mobile Alerting System (CMAS) or Earthquake and Tsunami Warning System (ETWS) system information update information.

16. The apparatus of claim 11, wherein the processing circuitry is further arranged to:
generate the paging message independent of whether downlink data is present for the least one UE in the paging occasion.

17. The apparatus of claim 11, wherein the processing circuitry is further arranged to:
repeat generation of the paging message every radio frame for Np frames starting from a paging frame, where Np is provided in system information.

18. The apparatus of claim 11, wherein:
the presence of the systemInfoModification-eDRX parameter indicates a Broadcast Control Channel (BCCH) modification other than SIB 10, SIB 11, SIB 12 and SIB 14.

19. The apparatus of claim 18, wherein the processing circuitry is further arranged to:
after transmission of the paging message, decode a RRC Connection Request with a Missed Paging Message, and
generate an RRC Connection Setup Reject with a No Missed Paging Message indication in response to the RRC Connection Request being from a UE other than the at least one UE and generate an RRC Connection Response in response to the RRC Connection Request being from the at least one UE.

20. A non-transitory computer-readable storage medium that stores instructions for execution by one or more processors of a user equipment (UE), the one or more processors to configure the UE to:
enter one of a sleep mode or an idle mode with an extended discontinuous reception cycle (eDRX) that is longer than a modification period throughout which a change in system information is transmitted by an evolved NodeB (eNB);
determine, after having exited the one of the sleep mode or idle mode, whether a paging message received during a paging occasion comprises a systemInfoModification-eDRX parameter;
in response to a determination that the paging message received during the paging occasion comprises a systemInfoModification-eDRX parameter, obtain system information that comprises a master information block (MIB) and a plurality of system information blocks (SIBs);
determine that previously stored system information is invalid through a determination that a systemInfoValueTag parameter of the previously stored system information is different from a systemInfoValueTag parameter of the system information obtained after reception of the paging message;
in response to a determination that the previously stored system information is invalid, replace previously stored system information with the system information obtained after reception of the paging message; and
perform a radio resource control (RRC) connection procedure after replacement of the previously stored system information with the system information obtained after reception of the paging message,
wherein the modification period in radio frames is proportional to a default paging cycle that indicates a number of radio frames over which a paging cycle comprising the POs occurs.

21. The um of claim 20, wherein the one or more processors further configure the UE to:
decode the paging message independent of whether downlink data is present for the UE in the paging occasion.

22. The medium of claim 20, wherein:
the RRC connection procedure is performed independent of whether uplink data is to be transmitted,
the RRC connection procedure comprises performance of a Random Access Channel (RACH) procedure and generation of a RRC Connection Request with a Missed Paging Message, and
the one or more processors further configure the UE to decode message with an RRC Connection Setup Reject with a No Missed Paging Message indication in response to the paging message being free from being directed to the UE and an RRC Connection Response in response to the paging message being directed to the UE.

23. The medium of claim 20, wherein the one or more processors further configure the UE to:
wake up from the one of the sleep mode and the idle mode a predetermined number of frames in advance of the paging occasion.

* * * * *

UNITED STATES PATENT AND TRADEMARK OFFICE
CERTIFICATE OF CORRECTION

PATENT NO.         : 10,194,482 B2
APPLICATION NO.    : 15/838990
DATED              : January 29, 2019
INVENTOR(S)        : Jha et al.

Page 1 of 1

It is certified that error appears in the above-identified patent and that said Letters Patent is hereby corrected as shown below:

In the Claims

In Column 11, Line 17, in Claim 1, before "information", insert --system--

In Column 12, Line 13, in Claim 8, delete "he" and insert --be-- therefor

In Column 13, Line 20, in Claim 16, before "least", insert --at--

In Column 14, Line 28, in Claim 21, delete "um" and insert --medium-- therefor

Signed and Sealed this
Twenty-first Day of April, 2020

Andrei Iancu
*Director of the United States Patent and Trademark Office*